United States Patent
Wood

(10) Patent No.: US 8,214,649 B2
(45) Date of Patent: Jul. 3, 2012

(54) SYSTEM AND METHOD FOR SECURE COMMUNICATIONS BETWEEN AT LEAST ONE USER DEVICE AND A NETWORK ENTITY

(75) Inventor: Joseph Stuart Wood, Andover, MA (US)

(73) Assignee: Nokia Corporation, Espoo (FI)

( * ) Notice: Subject to any disclaimer, the term of this patent is extended or adjusted under 35 U.S.C. 154(b) by 2060 days.

(21) Appl. No.: 10/881,314

(22) Filed: Jun. 30, 2004

(65) Prior Publication Data

US 2006/0005033 A1    Jan. 5, 2006

(51) Int. Cl.
*G06F 21/00* (2006.01)
(52) U.S. Cl. ........ 713/182; 713/183; 713/168; 713/169; 726/2; 726/3; 726/4; 726/5; 726/27; 709/225; 709/227; 455/466; 455/3.03
(58) Field of Classification Search .................. None
See application file for complete search history.

(56) References Cited

U.S. PATENT DOCUMENTS

| | | | | |
|---|---|---|---|---|
| 5,680,458 | A * | 10/1997 | Spelman et al. | 380/277 |
| 6,934,858 | B2 * | 8/2005 | Woodhill | 726/5 |
| 6,959,394 | B1 * | 10/2005 | Brickell et al. | 726/5 |
| 7,031,699 | B1 * | 4/2006 | Andersen | 455/419 |
| 7,039,713 | B1 * | 5/2006 | Van Gunter et al. | 709/229 |
| 7,139,917 | B2 * | 11/2006 | Jablon | 713/183 |
| 7,272,625 | B1 * | 9/2007 | Hannel et al. | 709/200 |
| 7,418,591 | B2 * | 8/2008 | Tachikawa | 713/155 |
| 7,502,936 | B2 * | 3/2009 | Weatherford et al. | 713/184 |
| 7,634,262 | B1 * | 12/2009 | Li | 455/419 |
| 7,933,413 | B2 * | 4/2011 | Steeves et al. | 380/278 |
| 2002/0067832 | A1 * | 6/2002 | Jablon | 380/277 |
| 2003/0101339 | A1 * | 5/2003 | Bianchini et al. | 713/153 |
| 2004/0030659 | A1 * | 2/2004 | Gueh | 705/67 |
| 2004/0030932 | A1 * | 2/2004 | Juels et al. | 713/202 |
| 2006/0156385 | A1 * | 7/2006 | Chiviendacz et al. | 726/2 |
| 2007/0150743 | A1 * | 6/2007 | Weatherford et al. | 713/184 |

OTHER PUBLICATIONS

WhiteHat Inc., *RSA Mobile* (visited Oct. 29, 2004) http://www.whitehatinc.com/rsasecurity/mobile/.

* cited by examiner

*Primary Examiner* — Syed A. Zia
(74) *Attorney, Agent, or Firm* — Alston & Bird LLP

(57) ABSTRACT

A system and method are provided for secure encryption via use of at least two different communication channels, such as the internet and a Short Message Service (SMS) channel, to transmit an authentication request and/or encryption information between at least one user device that is associated with a common user and a network entity. In this regard, an authentication request and/or the encryption information generated in response to an authentication request is separated into at least two portions and transmitted via different communication channels. Even if a third party accesses one of the communication channels and receives a portion of the authentication request and/or the resulting encryption information, the system and method effectively prevent the third party from receiving information sufficient to enable the third party to successfully interpret future communications between the parties since other portion(s) of the authentication request and/or the encryption information is transmitted via other channel(s).

34 Claims, 3 Drawing Sheets

| User | Client |
| --- | --- |
| Passphrase | ********** |
| Client SMS | +15551234567 |
| Server SMS | +15557654321 |

[ Cancel ]  [ Continue ]

FIG. 3

Please send the following message to +15557654321 immediately:

ABCD1234

FIG. 4

Please enter the 8 character key returned from +15557654321:

90ABCDEF

Cancel    Continue

FIG. 5

SYSTEM AND METHOD FOR SECURE COMMUNICATIONS BETWEEN AT LEAST ONE USER DEVICE AND A NETWORK ENTITY

FIELD OF THE INVENTION

The present invention relates generally to the field of network communications between at least one user device and a network entity and, more particularly, to the establishment of secure network communications between at least one user device and a network entity.

BACKGROUND OF THE INVENTION

It is desirable in many instances for two parties to communicate in a secure manner, such as via a network including, for example, the internet. In this manner, each party can be confident that the messages received from the other party were actually transmitted by the other party and have not been altered during transmission. Moreover, the parties to the communication can be confident that the messages transmitted therebetween cannot be intercepted and comprehended by a third party.

Generally, two parties can share information or other data securely under certain conditions. In this regard, the two parties can utilize keys and/or other techniques to encrypt and correspondingly decrypt the data. To avoid bypassing the security otherwise provided by encryption, however, no third party can have access to the unencrypted data at any point before, during, or after the parties communicate. Similarly, no third party can have access to the keys and/or techniques used to encrypt the data. In addition, the encryption techniques employed by the two parties must be of sufficient strength to ensure that third parties who access the encrypted data cannot decrypt the data, at least not before the need to secure the data has passed. Further, both parties should be able to verify that the other party is the correct party. Finally, no third party should be able to exist undetected between the two parties.

In a perfect world, the foregoing conditions would hold true, and encryption techniques would adequately safeguard communication channels. However, real world practicalities often prevent communications from meeting one or more of these conditions. As the number of WiFi sites and internet cafes grows, for example, communications networks become easier to access by both legitimate and other parties. In this regard, even in instances in which sophisticated encryption techniques are employed, third parties can abrogate the security of a communication channel by "spoofing the data source" or using a "man in the middle" attack. As explained below, these types of attacks negate the effectiveness of encryption techniques by breaching security without confronting the encryption technique itself.

In a spoofing attack, a first party intends to connect to and communicate with a second party but instead connects to and communicates with a third party. The third party communicates in the same manner and otherwise behaves like the intended party, thereby tricking the first party into trusting and communicating with the third party. The third party may then send incorrect information to or obtain information from the unwitting first party. Encryption cannot prevent the attack because the first party actually shares the encryption key with the third party since the first party believes that it is actually communicating with the intended recipient, i.e., the second party.

In a man in the middle attack, the first party actually connects to and communicates with the intended second party. A third party, though, taps into the communication channel and listens to information passed between the first and second parties. If the third party can identify passwords, encryption keys, or other such information that is passed between the first and second parties, the third party can decode the information communicated between the first two parties. Also, the third party can then use that information to spoof either party and learn still more information.

Current encryption techniques fail to prevent at least some attacks, such as spoofing and man in the middle attacks as described above, because the attacker obtains the necessary passwords, encryption keys or the like to decrypt the communications. One advancement in secure communications that has been provided by RSA Security employs two communication channels to lower the likelihood of these types of attacks. In this regard, the system provided by RSA Security requires users to send user login identification through the internet. The second party receives the identification and sends a one-time access code to the user's phone number that is on record with the second party. By sending the entirety of each piece of information over one channel (i.e., the entire user login identification and the access code are each sent through a single, albeit a different, channel), though, this technique fails to provide maximum security since the breach of either channel and, in particular, the channel by which the access code is provided can provide the third party with the information necessary to successfully monitor future communications between the parties.

SUMMARY OF THE INVENTION

The present invention discloses a system and method for secure encryption via use of two different communication channels, such as the internet and a Short Message Service (SMS) channel, to transmit an authentication request and/or encryption information between at least one user device that is associated with a common user and a network entity. In this regard, at least one of the authentication request and the encryption information generated in response to an authentication request is separated into at least two portions and transmitted via different communication channels. As such, even if a third party accesses one of the communication channels and therefore receives a portion of the authentication request and/or the resulting encryption information, the system and method of the present invention effectively prevents the third party from receiving information sufficient to enable the third party successfully intercept and interpret future communications between the parties since other portion(s) of the authentication request and/or the encryption information is transmitted via other channel(s).

One aspect of the invention discloses a system and method for authenticating a user. In this regard, a user device generates an authentication request, separates the authentication request into at least two portions, and transmits different portions of the authentication request to a network entity via two different communication channels in accordance with different protocols, such as transmitting portions of the authentication request via the internet and a SMS channel. In one embodiment, a single user device sends different portions of the authentication request over each of the channels. Alternatively, a first user device may send one portion of the authentication request over a first communications channel and either instruct the user to send another portion from a second user device over a second communications channel or directly provide another portion to a second user device for transmission over the second communications channel.

If a time delay greater than a predetermined length separates the network entity's receipt of the different portions of the authentication request, the network entity can refuse to authenticate the user. Otherwise, the network entity generally receives and combines the different portions of the authentication request in order to authenticate or refuse communication with the user, such as by comparing the authentication request with known information.

Another aspect of the invention discloses a system and method for transmitting encryption information that is generated in response to an authentication request. In this regard, a network entity, such as a server, generates encryption information in response to an authentication request, separates the encryption information into at least two portions, and transmits different portions of the encryption information via different communication channels. An end user, receiving the encryption information with a user device, then communicates in encrypted form with the network entity, generally via one of the communication channels.

As will be apparent, both aspects of the present invention can be utilized in tandem to further heighten security. The system and method of present invention therefore help to prevent spoofing attacks by requiring the user to send information over two communication channels. Whereas third parties may be able to spoof an intended recipient for messages transmitted via a single communications channel, third parties cannot easily spoof an intended recipient for messages transmitted via multiple communications channels, particularly those transmitted substantially simultaneously. For example, though internet sites are relatively easily spoofed by tricking the server into believing the third party is someone else, SMS messages are difficult to spoof. Accordingly, it is unlikely a third party could spoof messages transmitted via both the internet server and an SMS channel at the same time.

Additionally, aspects of the present invention also help to prevent man in the middle attacks by having the network entity send the encryption information, such as the encryption key, over at least two separate communication channels. A third party who intercepts information over one communication channel would therefore be unlikely to also intercept information transmitted over a second communications channel and, therefore, would not have access to all of the necessary encryption information, i.e., the third party could not reconstruct the entire encryption key.

BRIEF DESCRIPTION OF THE DRAWINGS

Figure 1:
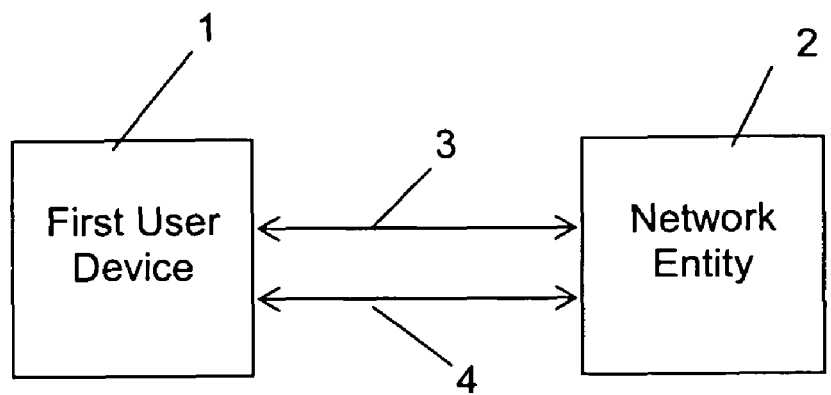
Figure 2:
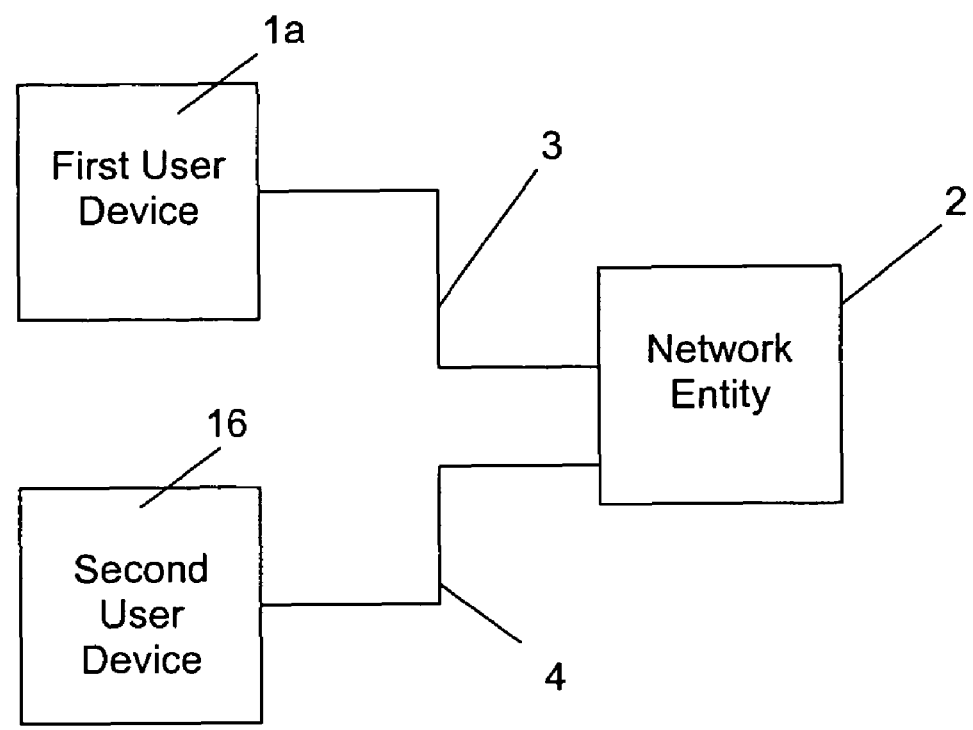

Having thus described the invention in general terms, reference will now be made to the accompanying drawings, which are not necessarily drawn to scale, and wherein:

FIG. 1 depicts a single user device connected to a network entity by two different communication channels according to one embodiment of the present invention;

FIG. 2 depicts two user devices connected to a network entity, each by a different communication channel, according to another embodiment of the present invention;

FIG. 3 shows a dialog box generated by an exemplary login applet, requesting a User Name, Passphrase, Client SMS number, and Server SMS number from a user, that is employed in accordance with one embodiment of the present invention;

FIG. 4 shows a text box asking a user to send information to a network entity via SMS that is generated in accordance with one embodiment of the present invention; and FIG. 5 is a text box asking a user to enter the portion of the encryption information that was received by the second user device in accordance with one embodiment of the present invention.

DETAILED DESCRIPTION OF THE PREFERRED EMBODIMENTS

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring to FIG. 1, a user device 1 connects to and communicates with a network entity 2 via two different communication channels 3, 4. Examples of user device 1 include, but are not limited to, a personal computer ("PC"), personal digital assistant, mobile telephone, or any other communications device. In addition, examples of the network entity 2 include, but are not limited to, a server, a router, a gateway, a user device such as any of those listed above that is capable of network communications as well as any other device able to communicate via a network with another device.

While the user device 1 and the network entity 2 are shown to communicate via two communication channels 3, 4, the user device 1 and the network entity 2 could similarly communicate via three or more different communication channels according to other embodiments of the present invention. For purposes of example, but not of limitation, however, communications between the user device 1 and the network device 2 via two different communications channels 3, 4 will be hereinafter described. Any two different communication channels may be employed so long as the communication channels are designed to transmit messages or other information in accordance with different protocols. Thus, the user device 1 and the network entity 2 may communicate via first and second communications channels 3, 4 that support the transmission of messages or other information in accordance with first and second different protocols, respectively. Exemplary communication channels include the internet and a Short Message Service ("SMS") channel, although other communications channels such as a Multimedia Messaging Service ("MMS") channel may be utilized if so desired.

In one common embodiment, a client/server relationship exists between a personal computer that functions as the user device 1 and a server that functions as a network entity 2. In this exemplary embodiment, the personal computer and the server are connected and can communicate via the internet that serves as the first communication channel 3 and via an SMS channel that serves as the second communication channel 4. Using a standard internet browser accessible via the personal computer, the user accesses the login internet address for the server. A Java applet, as shown in FIG. 3, is downloaded to the personal computer and is thereafter executed to prompt the user for authentication information (such as a User Name and Passphrase), the number that the user device 1 uses to send and receive SMS messages (Client SMS), and the number used by the server 2 to send and receive SMS messages (Server SMS). After the user clicks "Continue," the Java applet may then encrypt the User Name, Passphrase and Client SMS, such as by determining the digital signature by, for example, calculating the respective MD5 signature (in hexadecimal) of the User Name, Passphrase, and Client SMS. The applet then separates each of the User Name and Passphrase signatures into two portions, sending one portion of each signature and the entire Client SMS signature to the server as a single message via the internet. The personal computer then sends the remaining portions of the User Name and Passphrase signatures to the server's SMS number via the SMS channel. The user device 1 may send the different portions of the authorization request at the same time or at different times.

As will be apparent, however, the user device may obtain the authentication information in other manners including, for example, accessing authorization information that has been previously stored on or is otherwise accessible by the user device 1. Moreover, the authorization information that constitutes the authorization request submitted by the user device may include different types of information and may be separated in different manners without departing from the spirit and scope of the present invention so long as the different portions of the authorization request are transmitted via different communications channels.

In an alternative embodiment, the user operates two or more devices, as shown in FIG. 2. As an example, the user could utilize a first user device 1a which could be a personal computer, and a second user device 1b which could be a mobile telephone or other mobile terminal. The first user device 1a may connect to the network device 2, such as a server, via a first communications channel 3, such as the internet, and the second user device 1b may connect separately to the network device 2, such as the same server, through a second communications channel 4, such as an SMS channel. In this embodiment, the first user device sends one portion of the authorization request, such as respective portions of each of the User Name and Passphrase signatures, to the network entity via the first communications channel, and the first user device presents the user with the remaining portions of the User Name and Passphrase signatures in a text box presented as a display associated with the first user device, as shown in FIG. 4. The text box advises the user to send the information, preferably relatively immediately, via the second communications channel 4, such as from the second user device 1b to the SMS number of the network entity. Alternatively, the first user device 1a could automatically provide the remaining portion of the authorization request, such as the User Name and Passphrase signatures, to the second user device 1b, such as via a wireline or through a wireless connection such as Bluetooth. The second user device 1b could then automatically send the remaining portion of the authorization request via the second communications channel, such as to the SMS number of the network entity without user intervention, either simultaneous with or at a different time than the message transmitted via the first communications channel.

Upon receipt of the first and second portions of the authorization request, the network entity 2 reassembles the different portions, decrypts the authorization request if necessary and determines if further communications with the user are authorized or are to be rejected. In the embodiment in which the network entity 2 is a server designed to receive different portions of the User Name, Passphrase and Client SMS (generally in an encrypted form) via the internet and on SMS channel, the server will receive one message, typically via the internet. The server then separates the message into the signatures associated with the User Name, Passphrase, and Client SMS. Also, the server initializes a timer to monitor the elapsed time until the message is received via the other communications channel. In one embodiment, if the timer reaches a predetermined length of time, say one minute, before the server receives the other message, the server will terminate the internet connection and refuse to authenticate the user. If the server receives the other message within the predetermined time period, such as via an SMS channel, however, the server may encrypt the incoming SMS number, such as by creating an MD5 signature of the incoming SMS number (presumably that of a personal computer in a single user device embodiment or the mobile telephone in a dual user device embodiment). If the signature of the incoming SMS number matches the Client SMS signature received from the user via the internet, the server separates the second message into its respective signatures and combines them with the signatures received over the internet to form the original User Name and Passphrase signatures. If the signatures are not combinable for some reason, the server may terminate the connection and refuse to authenticate the user.

When the server has pieced together the original signatures, the server verifies them by comparing them with predefined signatures stored by or otherwise accessible by the server. The server will reject the authentication request if the User Name, Passphrase, or Client SMS signatures do not match. Alternatively, the server will verify the authorization request if the respective signatures do match. Although the foregoing process of receiving and analyzing the different portions of authorization request has been described in conjunction with a server communicating via the internet and an SMS channel with a user device, the system and method of the present invention may include different types of network devices 2 and different types of communications channels 3, 4, if so desired. Moreover, the content of the authorization request and the manner in which the authorization request is separated may also differ as noted above.

Upon successful verification, the network entity will accept the connection and begin the encryption process. In one embodiment, the network entity 2 determines a unique encryption key of any size, though at least 128-bit is advantageous. The network entity then separates the key into at least two portions and transmits the different portions via different communications channels, such as by transmitting one portion to the user device, such as a personal computer, via the internet and the other portion to the user device via the SMS channel. For security purposes, it is preferable to send substantial portions of the encryption key via each channel. The user device receives each portion from the respective channels and combines the two portions to recreate the original key. When both the user device 1 and network entity 2 have the complete encryption key, the user device 1 and the network entity 2 can begin secure communication via any one of the communications channels, using any key-based encryption method available. Although the generation of an encryption key is described above, the network entity may generate other types of encryption information if desired.

In an embodiment having at least two user devices 1a, 1b, the network entity 2 sends one portion of the encryption information, such as one portion of an encryption key, to a first user device, such as a personal computer, over the first communications channel, such as the internet, and the second portion to the second user device, such as a mobile telephone, over the second communications channel, such as the SMS channel. In this embodiment, the first user device receives the first portion of the key and generates another Java applet that generates a message typically depicted upon the display of the first user device asking the user for the remainder of the key as sent to the second user device. See FIG. 5. The user then inputs the second portion of the encryption key and clicks "Continue." Although a first user device capable of launching and executing a Java applet is described, the user could be prompt to enter the other portion of the encryption information in other manners, if so desired. Alternatively, the second user device, if properly enabled, could provide the second portion of the key directly to the first user device through a Bluetooth connection or some other connection, be it wireline, wireless or otherwise. The first user device combines the two portions to recreate the original key and then establishes encrypted communications with the network entity 2 via any one of the communications channels.

By way of example, suppose the user enters the appropriate information into the initial Java login applet executed by the first user device 1, and the applet returns the following hexadecimal signatures: 'ABCD1234DCBA5678' for User Name, '12345678ABCDDCBA' for Passphrase, and '1A2B3C4D5D6C7B8A' for Client SMS. The first user device 1 and, in particular, the applet separates User Name and Passphrase signatures into 'ABCD+1234 DCBA5678' and '1234+5678ABCDDCBA', respectively. Although the applet only separates the first four digits from each signature in this example, it could divide them at any point. In an embodiment communicating via the internet and an SMS channel, the first user device transmits the longer portions of the signatures via the internet because the SMS channel transmits shorter messages more efficiently. Accordingly, the first user device 1 sends the second portion of the User Name signature, the second portion of the Passphrase signature, and the Client SMS signature to the network entity, typically as one string, '1234DCBA56785678ABCDDCBA1A2B3C4D5D6C7B8A.' In the embodiment of FIG. 1, the first user device sends the remaining portions of the signatures via the SMS channel, such as in a string, 'ABCD1234.' In the embodiment of FIG. 2, however, the first user device 1a either notifies the user of the information to send via the second user device 1b or provides the information directly to the second user device 1b.

When the network entity 2 receives the string transmitted via the internet, the network entity breaks the string into the original pieces and begins the timer. If the second message reaches the network entity within the predetermined time, the network entity splits the second message into its original components. The network entity may also calculate the signature of the incoming SMS number, and determine if it matches the Client SMS signature. Assuming that the SMS signatures match, the fragments received over the internet are combined with those from the SMS channel. In the foregoing example, the network entity 2 therefore determines ABCD1234DCBA5678' to be the User Name and '12345678ABCDDCBA' to be the Passphrase. If the received signatures match predefined signatures, the network entity then calculates a unique encryption key, 1234567890ABCDEF, for this example. The network entity then divides the key, such as in halves, sending one portion via the internet and the other portion via the SMS channel. In the embodiment of FIG. 1, the first user device 1 receives both portions of the key, combines them, and begins encrypted communication with the network entity via any one of the communications channels. In the embodiment of FIG. 2, however, the first user device 1a receives the portion of the key transmitted via the internet and either prompts the user for the remainder or receives the other portion directly from the second user device via a wireline or wireless connection. When the first user device receives the complete key, the first user device 1 can begin encrypted communication with the network entity 2.

As will be apparent, the authorization request and the resulting encryption information can be split in many different manners and transmitted via any one of the communications channels so long as both the user device(s) 1 and network entity 2 generate, transmit and recombine the different portions in the same manner. In addition, while the system and method of the present invention are described to transmit portions of both the authorization request and the encryption information via different communications channels, the system and method may separate only one of the authorization request and the encryption information into portions that are transmitted via different communications channels if so desired. By establishing the secure communication by means of an authorization request and/or encryption information that is split into multiple portions and transmitted via different communications channels, the system and method of the present invention provides increased security, including increased security relative to spoofing and man-in-the-middle attacks.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
at least one user device associated with a common user, such that the at least one user device is configured to communicate with a network entity via first and second communication channels in accordance with first and second different protocols, respectively,
wherein said at least one user device is configured to submit an authentication request to said network entity by separating the authentication request into at least two portions and cause transmission of a different portion of the authentication request via the first communication channel than any portion of the authentication request that is transmitted via the second communication channel.

2. The system of claim 1 wherein the at least one user device comprises a single user device and the network entity comprises a single network server.

3. The system of claim 1 wherein the at least one user device comprises at least two different user devices that each are configured to transmit a respective portion of the authentication request.

4. The system of claim 3 wherein the at least two different user devices comprise first and second user devices with said first user device configured to generate the authentication request and provide the user with a portion of said authentication request to transmit from said second user device to the network entity.

5. The system of claim 1 wherein the first and second communication channels utilized by the at least one user device are the internet and a Short Message Service (SMS) channel, respectively.

6. The system of claim 1 wherein the network entity is configured to generate encryption information and submit the encryption information to the at least one user device in response to the authentication request by separating the encryption information into at least first and second portions and cause transmission of the first and second portions of the encryption information via the first and second communication channels respectively.

7. The system of claim 1 wherein the at least one user device is configured to communicate in encrypted form with the network entity via at least one of the first and second communication channels.

8. The system of claim 1 wherein the network entity is configured to combine the different portions of the authentication request to authenticate or reject the communication from the user.

9. The system of claim 1 wherein the network entity is configured to reject the authentication request if the network entity experiences a time delay of at least a predetermined length between receiving different portions of the authentication request.

10. A method comprising:
generating an authentication request;
separating the authentication request into at least two portions; and
causing a different portion of the authentication request to be transmitted via a first communication channel than any portion of the authentication request that is transmitted via a second communication channel, the first and second communication channels being established between at least one user device associated with a user and a network entity such that the user is authenticatable by the network entity.

11. The method of claim 10 wherein transmitting the different portions of the authentication request comprises causing transmission of different portions of the authentication request between a single user device and the network entity, wherein the network entity comprises a single server.

12. The method of claim 10 wherein transmitting the different portions of the authentication request comprises cause transmission of different portions of the authentication request between at least two different user devices and the network entity.

13. The method of claim 12 wherein the at least two different user devices comprise first and second user devices, and wherein generating the authentication request comprises generating the authentication request with the first user device, and wherein separating the authentication request comprises having the first user device provide the user with a portion of the authentication request to transmit from the second user device to the network entity.

14. The method of claim 10 wherein causing different portions of the authentication request to be transmitted via first and second communication channels comprises causing transmission of different portions of the authentication request via the internet and a Short Message Service channel.

15. The method of claim 10 further comprising:
generating encryption information at the network entity in response to the authentication request; and
submitting the encryption information to the at least one user device by separating the encryption information into at least first and second portions and causing transmission of the first and second portions of the encryption information via the first and second communication channels respectively.

16. The method of claim 10 wherein causing transmission of different portions of the authentication request via first and second communication channels comprises causing transmission of at least one portion of the authentication request in encrypted form to the network entity.

17. The method of claim 10 further comprising combining the different portions of the authentication request at the network entity to authenticate or reject the communication from the user.

18. The method of claim 10 further comprising rejecting the authentication request at the network entity if the network entity experiences a time delay of a predetermined length between receiving different portions of the authentication request.

19. A system comprising:
a network entity in communication with at least one user device associated with a common user, wherein the network entity is configured to communicate with the at least one user device via first and second communication channels in accordance with first and second different protocols, respectively,
wherein said network entity is configured to generate encryption information and to submit said encryption information in response to an authentication request from the at least one user device by separating the encryption information into at least two portions and cause transmission of a different portion of the encryption information via the first communication channel than any portion of the encryption information that is transmitted via the second communication channel.

20. The system of claim 19 wherein the at least one user device comprises a single user device and the network entity comprises a single network server.

21. The system of claim 19 wherein the at least one user device comprises at least two different user devices that each are configured to receive a respective portion of the encryption information.

22. The system of claim 19 wherein the first and second communication channels utilized by said network entity are the internet and a Short Message Service (SMS) channel, respectively.

23. The system of claim 19 wherein the at least one user device is configured to communicate in encrypted form with the network entity via at least one of the two communication channels.

24. The system of claim 19 wherein said at least one user device is configured to submit an authentication request to said network entity by separating the authentication request into at least first and second portions and causing transmission of the first and second portions of the authentication request via the first and second communication channels respectively.

25. The system of claim 24 wherein said network entity is configured to combine the different portions of the authentication request to authenticate or reject the authentication request from the user.

26. The system of claim 24 wherein said network entity is configured to reject the authentication request from the user if said network entity experiences a time delay of at least a predetermined length between receiving different portions of the authentication request.

27. A method comprising:
generating encryption information in response to an authentication request;
separating the encryption information into at least two portions; and
causing a different portion of the encryption information to be transmitted via a first communication channel than any portion of the encryption information that is transmitted via a second communication channel, the first and second communication channels being established between a network entity and at least one user device associated with a common user such that the encryption information is receivable by the at least one user device.

28. The method of claim 27 wherein causing the different portions of the encryption information to be transmitted comprises causing transmission of different portions of the encryption information between the network entity and a single user device, wherein the network entity is a single network server.

29. The method of claim 27 wherein causing the different portions of the encryption information to be transmitted comprises causing transmission of different portions of the encryption information between the network entity and at least two different user devices.

30. The method of claim 27 wherein causing different portions of the encryption information to be transmitted via first and second communication channels comprises causing transmission of different portions of the encryption information via the internet and a Short Message Service channel.

31. The method of claim 27 further comprising submitting an authentication request by the at least one user device to the network entity by separating the authentication request into at least first and second portions and causing transmission of the first and second portions of the authentication request via the first and second communication channels respectively.

32. The method of claim 31 further comprising combining the different portions of the authentication request at the network entity to authenticate or reject the authentication request from the user.

33. The method of claim 31 further comprising rejecting the authentication request from the user if the network entity experiences a time delay of at least a predetermined length between receiving different portions of the authentication request.

34. The method of claim 31 wherein causing the different portions of the authentication request to be transmitted comprises causing transmission of at least one portion of the authentication request via a respective communication channel in an encrypted form.

* * * * *